Feb. 26, 1935.　　　　G. D. HOUSTON　　　　1,992,428
CULTIVATOR
Filed Oct. 3, 1932　　　3 Sheets-Sheet 1
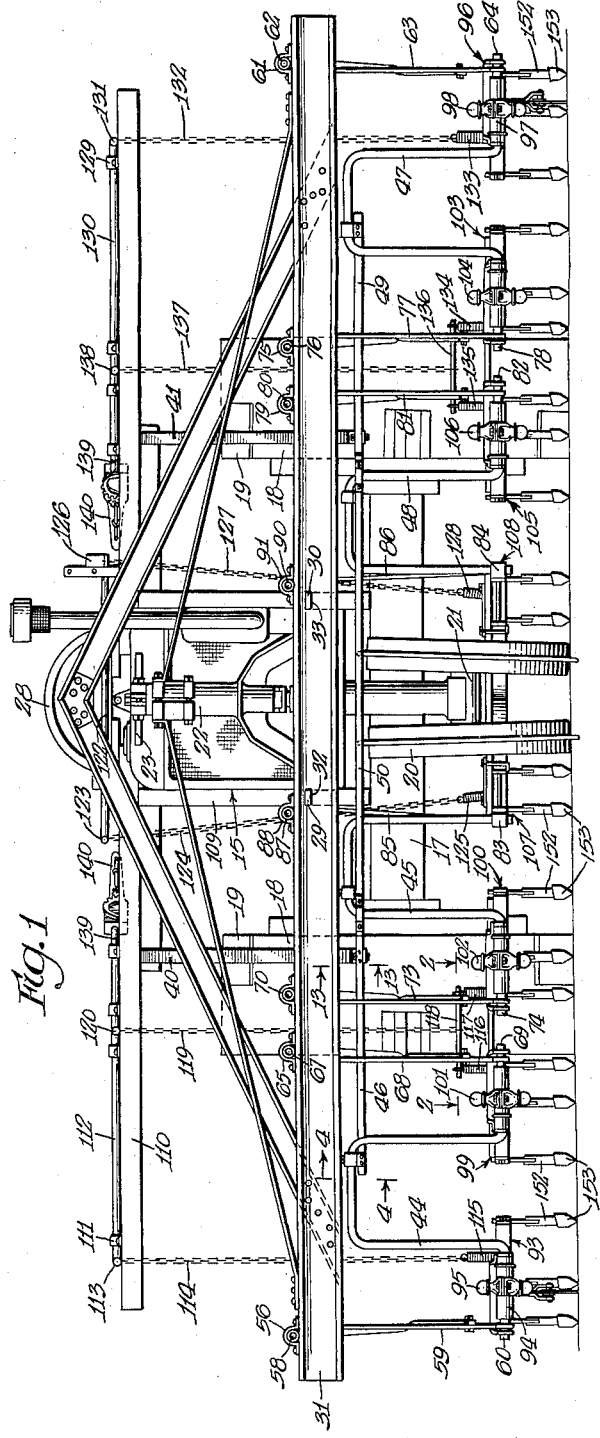
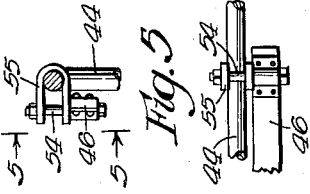
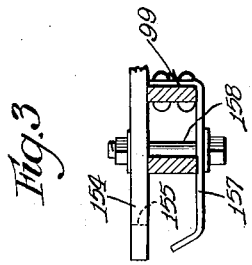
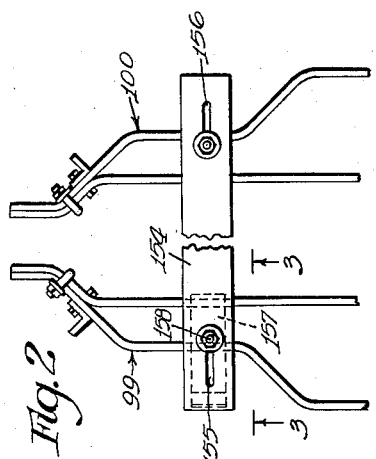
Inventor:
George D. Houston
By: Wm. O. Bell
Atty.

Feb. 26, 1935.  G. D. HOUSTON  1,992,428
CULTIVATOR
Filed Oct. 3, 1932   3 Sheets-Sheet 2
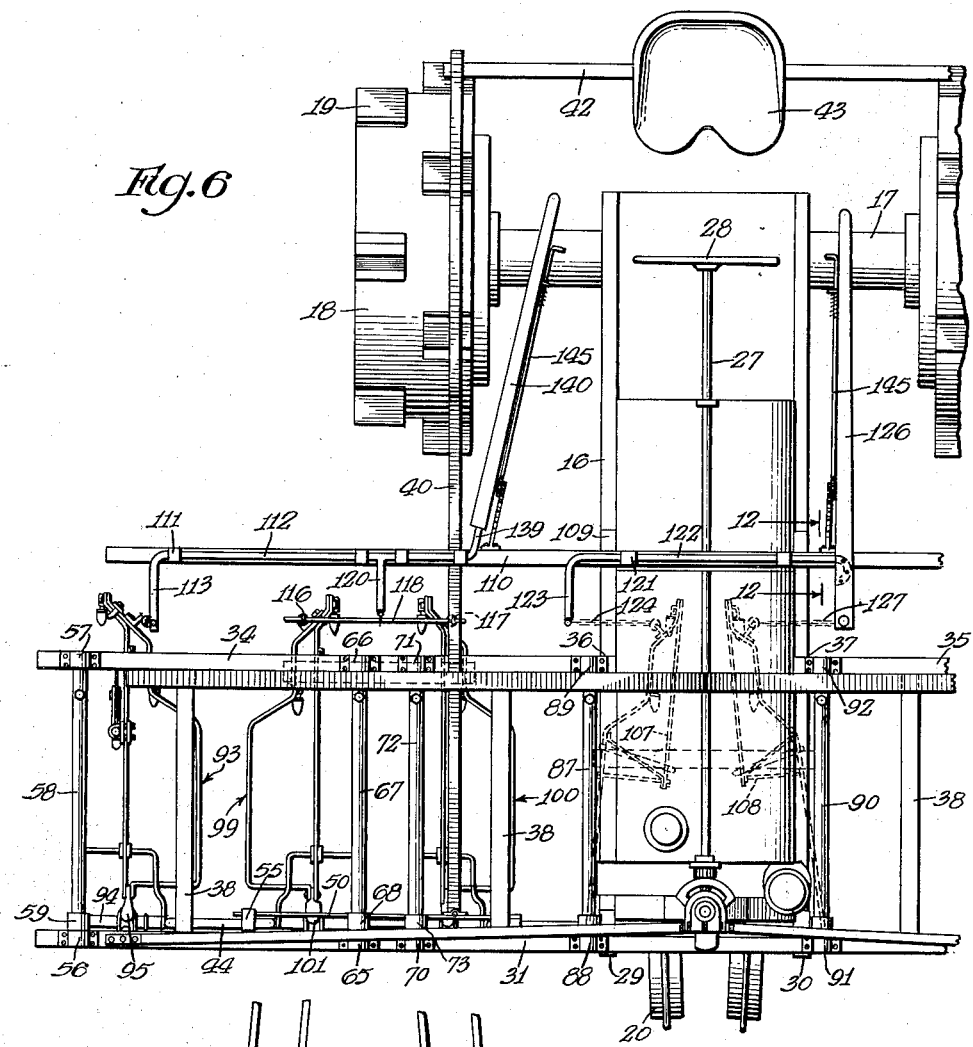
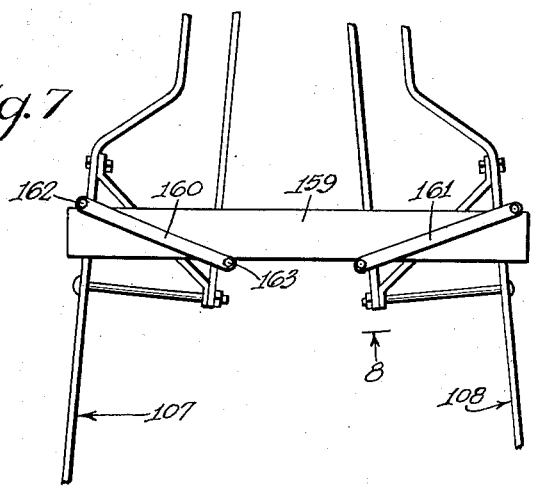
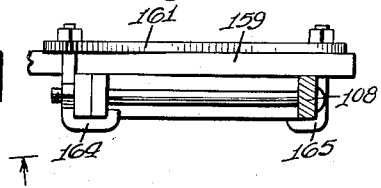
Inventor:
George D. Houston
By: Wm O Bell
Atty.

Feb. 26, 1935.  G. D. HOUSTON  1,992,428
CULTIVATOR
Filed Oct. 3, 1932   3 Sheets-Sheet 3
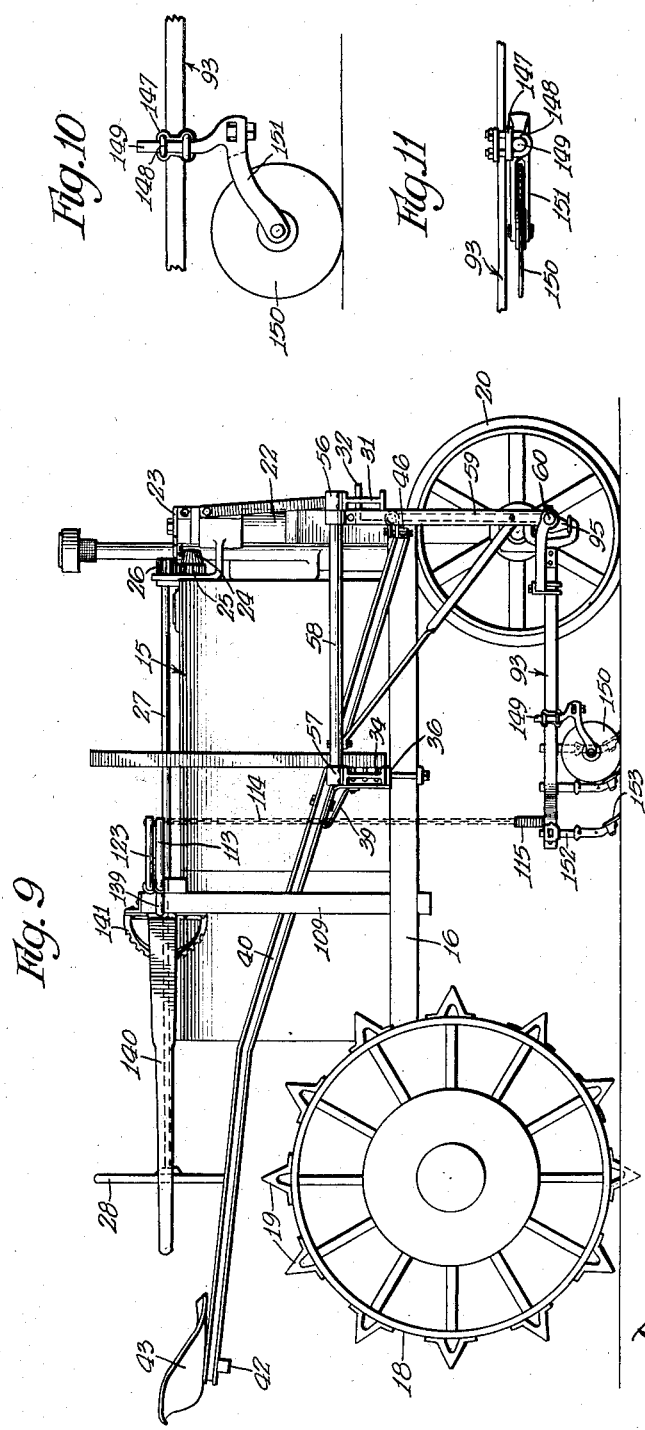
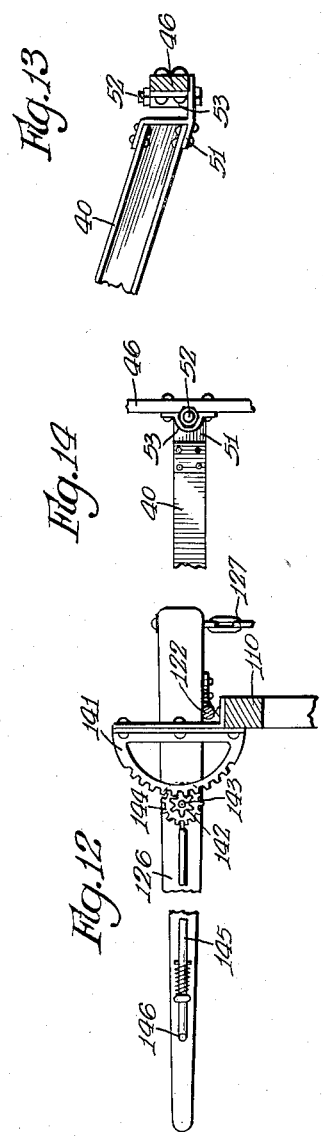
Inventor:
George D. Houston
By: Wm. O. Bell
Atty.

Patented Feb. 26, 1935

1,992,428

UNITED STATES PATENT OFFICE 1,992,428

CULTIVATOR

George D. Houston, Rushville, Ill.

Application October 3, 1932, Serial No. 635,938

5 Claims. (Cl. 97—47)

This invention relates to cultivators and more particularly to a cultivator adapted for use with a tractor.

The primary object of the invention is to provide a novel cultivator which may be directly mounted on the frame of the tractor.

Another object is to provide a cultivator which may be guided independently of the tractor to insure proper functioning thereof.

Further objects are to provide a cultivator wherein the shifting of the shovels is aided by the weight of the operator to facilitate adjustment of the shovels so that the course of travel thereof may be accurately determined; to provide a simple arrangement for retracting the shovels from the ground when so desired or required; and to provide a cultivator of simple and economical construction and efficient and positive operation.

A selected embodiment of the invention is illustrated in the accompanying drawings wherein Fig. 1 is a front elevation of my novel cultivator mounted on a tractor;

Fig. 2 is a fragmentary plan detail view taken substantially on the line 2—2 on Fig. 1;

Fig. 3 is a fragmentary detail view taken substantially on the line 3—3 on Fig. 2;

Fig. 4 is a fragmentary detail view taken substantially on the line 4—4 on Fig. 1;

Fig. 5 is a fragmentary detail view taken substantially on the line 5—5 on Fig. 4;

Fig. 6 is a fragmentary plan view;

Fig. 7 is a view, similar to Fig. 2, showing the adjustment provided for the medial cultivator beams;

Fig. 8 is a fragmentary detail view taken substantially on the line 8—8 on Fig. 7;

Fig. 9 is a side elevation;

Fig. 10 is a detail view, drawn to an enlarged scale, illustrating the gauge wheel provided on the outermost beams;

Fig. 11 is a plan view of the parts shown in Fig. 10;

Fig. 12 is a fragmentary detail view taken substantially on the line 12—12 on Fig. 6;

Fig. 13 is a view taken substantially on the line 13—13 on Fig. 1; and

Fig. 14 is a fragmentary plan detail view of the parts shown in Fig. 13.

In the accompanying drawings wherein a selected embodiment of my invention is illustrated, 15 generally indicates a tractor including a frame 16 and a rear axle 17 carried by wheels 18 having cleats 19 thereon. The front of the tractor is supported by wheels 20 mounted on an axle 21. A post 22 is rotatably mounted at the front of the tractor and the lower end thereof is connected to the axle 21. A gear segment 23 at the upper end of the post 22 is meshed with a pinion 24 mounted on the same shaft as a gear 25 that meshes with the gear 26 fast on the shaft 27 extending along the top of the tractor and having a hand wheel 28 thereon so that by manipulation of the hand wheel 28 the wheels 20 may be turned to guide the tractor.

Brackets 29 and 30 are provided at the front of the tractor on opposite sides thereof and my improved cultivator includes a front beam 31 which in the present instance has openings 32 and 33 therein through which arms of the brackets 29 and 30 are respectively directed. The rear beam of my improved cultivator is comprised of two sections 34 and 35, each of which terminates at and is secured to a side rail of the tractor frame 16, the section 34 being connected to the tractor frame at 36 and the section 35 being connected to the tractor frame at 37. The front and rear beams of the cultivator frame are interconnected by spaced braces 38 which extend between these beams and have their ends suitably connected to the beams. If desired, a substantially V-shaped brace may be provided, having the apex thereof mounted over the tractor and its ends connected to the sections 34 and 35. Tie rods may be provided to connect the front beams to the tractor frame should this be found to be desirable. Thus, it will be seen that a rigid frame is provided for my cultivator and the connections between this frame and the tractor frame are preferably detachable so that the cultivator may be removed from the tractor or installed thereon as required.

It has been stated that an object of the invention is to facilitate the shifting of the cultivator shovels and that this is expedited by utilizing the weight of the operator. To this end I provide spring brackets such as 39 (Fig. 9) which are respectively secured to the rear beam sections 34 and 35 adjacent the frame 16. Bars 40 and 41 are pivotally mounted on these brackets and extend beyond the axle 17 and are positioned thereabove as best shown in Figs. 6 and 9. A cross brace 42 interconnects the rear ends of the bars 40 and 41 and a seat 43 is medially mounted on this cross brace 42. The seat 43 is positioned in substantially the same position as the usual seat of the tractor which is removed when my cultivator is mounted on the tractor. The shovels are carried by cultivator beams, which, in turn, are carried in part by arches as will be described more fully hereinafter.

At one end of the cultivator frame is an arch 44 and spaced inwardly therefrom is another arch 45. These arches are interconnected by a tie rod 46. An arch 47 is provided at the other end of the cultivator frame and inwardly thereof is an arch 48 and these arches are interconnected by a tie rod 49. The arches 45 and 48 are interconnected by a tie rod 50. As best illustrated in Figs. 13 and 14, an angle plate 51 is fixedly secured to the forward end of the bar 40 and this angle plate carries a vertically extending pintle 52. A suitable bearing structure 53 embraces this pintle and is secured to the tie rod 46 and this arrangement provides a pivotal interconnection between the bar 40 and the tie rod 46. A similar pivotal interconnection is provided between the bar 41 and the tie rod 49. Thus since the bars 40 and 41 are pivotally mounted on the spring brackets 39 and as these bars are pivotally connected to the tie rods, it is clear that the frame comprising the bars 40 and 41 may be shifted relative to the tractor frame.

It is desirable that the tie rods move rectilinearly and to this end the arches are pivotally interconnected to the tie rods and this interconnection is illustrated in Figs. 4 and 5. As there shown a vertically extending pintle 54 is secured to the tie rod 46 and a substantially U-shaped bearing device 55 embraces the bight of the arch 44 and has the ends thereof pivotally connected to the pintle 54. Each of the arches is so connected to one of the tie rods.

The arches are carried by the frame through what I call a solid hinge arrangement. Aligned bearings 56 and 57 are respectively mounted on the front beam 31 and the rear beam section 34, adjacent the ends thereof, and a shaft 58 is journaled in these bearings. A hanger 59 has one end thereof fast to the shaft 58 adjacent the bearing 56 and a branch 60 extending outwardly from the outer leg of the arch 44 is pivotally connected to the lower end of the hanger 59. A diagonally extending brace is connected to the shaft 58 adjacent the bearing 57 and it is also connected to hanger 59. Bearings such as 61, similar to the bearings 56 and 57, are respectively provided on the front beam 31 and the rear beam section 35 and a shaft 62 is journaled in these bearings. A hanger 63 is fast to the front end of the shaft 62 and an outwardly extending branch 64 on the outer leg of the arch 47 is pivotally connected to the lower end of this hanger. A diagonally directed brace extends between the rear end of shaft 62 and the lower end of hanger 63. Intermediate the arches 44 and 45 and respectively mounted on the front beam 31 and the rear beam section 34 is a pair of bearings 65 and 66 in which a shaft 67 is journaled. A hanger 68 is fast to the front end of the shaft 67 and a branch 69 extending from the arch 44, opposite to the branch 60, is pivotally mounted in the lower end of this hanger. A diagonally directed brace extends between the rear end of shaft 67 and the lower end of hanger 68. Another pair of bearings 70 and 71 are mounted in juxtaposition to the bearings 65 and 66 and a shaft 72 is journaled in these bearings. A hanger 73 is fast on the shaft 72 and a branch 74 extending outwardly from the outer leg of the arch 45 is pivotally connected to this hanger. A diagonally directed brace extends between the rear end of shaft 72 and the lower end of hanger 73. A pair of bearings such as 75 are respectively mounted on the front beam 31 and the rear beam section 35 intermediate the arches 47 and 48 and a shaft 76 is journaled in these bearings. A hanger 77 is fast on this shaft and a branch 78 extending from the arch 47 opposite to the branch 64 is pivotally connected to the lower end of this hanger. A diagonally directed brace extends between the rear end of shaft 76 and the lower end of hanger 77. A pair of bearings such as 79 is mounted in juxtaposition to the bearings 75 and a shaft 80 is journaled in these bearings. One end of a hanger 81 is fast on the shaft 80 and a branch 82 extending from the arch 48 toward the branch 78 and in alignment therewith is pivotally connected to the lower end of this hanger. A diagonally directed brace extends between the rear end of shaft 80 and the lower end of hanger 81. The inner legs of the arches 45 and 48 do not have branches extending parallel to the branches 74 and 82. Rather bearings 83 and 84 are respectively provided at the lower ends of the legs of these arches and hangers 85 and 86 have corresponding ends thereof respectively connected to these bearings. The upper end of the hanger 85 is fast to a shaft 87 journaled in bearings 88 and 89 respectively mounted on the beam 31 and the beam section 34. The upper end of the hanger 86 is fast to a shaft 90 journaled in bearings 91 and 92 respectively mounted on the beam 31 and the beam section 35. Diagonally directed braces extend between the rear ends of the shafts 87 and 90 and the lower ends of hangers 85 and 86. Since the shafts are rotatable on the frame of the cultivator and as the arches are carried by braced hangers fast on these shafts, it is clear that movement imparted to the arches from the tie rods must necessarily be rectilinear because the hangers and shafts provide hinges on which the arches move. The braced hangers effectively resist the thrust impressed thereon during operation of the cultivator.

The forward ends of the cultivator beams are carried by the arches. The outermost cultivator beam 93 at one end of the cultivator includes a bearing portion 94 that is connected to the branch 60 by a universal connection 95 which is preferably in the nature of a ball and socket joint. The other outermost cultivator beam 96 includes a bearing portion 97 which is connected to the branch 64 by a universal joint 98 which likewise is preferably a ball and socket joint, as are the other universal joints employed herein. A cultivator beam 99 carries shovels which plow on the other side of the hill plowed by the shovels carried by the beam 93. Mounted in juxtaposition to the beam 99 is a beam 100. The front ends of the beams 99 and 100 are respectively connected to the branches 69 and 74 by universal joints 101 and 102. A beam 103 carries shovels which plow the opposite side of the hill plowed by the shovels carried by the beam 96 and the forward end of this beam is connected to the branch 78 by a universal joint 104. A cultivator beam 105 is mounted in juxtaposition to the beam 103 and is interconnected to the branch 82 by a universal joint 106. A pair of cultivator beams 107 and 108 are positioned on opposite sides of the wheels 20 and are respectively arranged in juxtaposition to the beams 100 and 105. The beam 107 is pivotally connected to the bearing 83 and the beam 108 is pivotally connected to the bearing 84. Thus each of the cultivator beams is supported at its front end for pivotal movement in a vertical plane.

The rear ends of the cultivator beams are supported in a floating manner. A frame 109 is connected to the tractor frame 16 rearwardly of the rear beam sections 34 and 35. A cross beam 110 is carried by the frame 109. A set of bearings 111 is provided on the beam 110 and a shaft 112 is jouraled in these bearings. At the outer end of the shaft 112 is a forwardly extending arm 113 and one end of a chain 114 is connected to the free end of this arm. The lower end of this chain is connected to a spring 115, the opposite end of which spring is connected to the rear end of the cultivator beam 93. Springs 116 and 117 have corresponding ends thereof respectively connected to the cultivator beams 99 and 100 and the opposite ends of these springs are interconnected by a tie rod 118. One end of a chain 119 is medially connected to the tie rod 118 and the other end of this chain is connected to an arm 120 extending from the shaft 112. A pair of bearings 121 are mounted on the beam 110 substantially medially thereof and a shaft 122 is journaled in these bearings. At one end of the shaft 122 is an arm 123 to which one end of a chain 124 is connected. The other end of this chain 124 is connected to a spring 125 which is connected to the rear end of the cultivator beam 107. At the end of the shaft opposite the arm 123 is a lever 126 which includes an end that extends parallel to the arm 123. One end of a chain 127 is connected to this end of the lever 126 and the other end of this chain is connected to a spring 128 that is fast to the rear of the cultivator beam 108. Adjacent the end of the beam 110 opposite that having the bearings 111 thereon is a set of bearings 129 in which a shaft 130 is journaled. At one end of the shaft 130 is an arm 131 to the free end of which one end of a chain 132 is secured. The other end of this chain is connected to a spring 133 fast to the rear end of the cultivator beam 96. Springs 134 and 135 are respectively connected at the rear ends of the cultivator beams 103 and 105 and these springs are interconnected by a tie rod 136. Medially connected to the tie rod 136 is one end of a chain 137 and the opposite end of this chain is connected to the free end of an arm 138 on the shaft 130. Both of the shafts 112 and 130 include rearwardly extending portions such as 139 (Figs. 1 and 6) and levers such as 140 are connected to these rearwardly extending portions. The levers 140 and the lever 126 all terminate at a position convenient to the operator on the seat 43. The levers 140 and 126 are employed to elevate the rear ends of the cultivator frames to retract the shovels from the ground and also by positioning these levers in a predetermined manner the depth the shovels will dig can be determined. To this end each lever is arranged in the manner illustrated in Fig. 12 wherein the lever 126 is illustrated. Secured to the cross beam 110 adjacent each of the levers is a gear segment 141, the teeth of which are engaged by a pinion 142 fast on the shaft 143 journaled in the adjacent lever arm. Fast on this same shaft is a ratchet 144 engaged by the spring-urged pawl 145 that is elongated and extends along the lever and which has a handle 146 at the free end thereof. By grasping the handle 146 the pawl may be retracted from engagement with the ratchet and the lever may then be moved into adjusted positions.

In order to determine the depth of digging of the shovels carried by the outermost cultivator beams, gauge wheels are provided on these beams. The gauge wheel for the beam 93 is illustrated in Figs. 9 and 10. A bearing 147 is secured to the beam 93 and includes releasable U-bolts 148 which embrace the vertically extending shaft 149. By loosening the U-bolts, the position of the shaft 149 may be adjusted and this in turn determines the depth to which the gauge wheel 150 may move, this gauge wheel being carried by a bifurcated arm 151 extending from the lower end of the shaft 149.

Secured at suitable places on the cultivator beam are shovel posts 152 having shovels 153 detachably mounted thereon.

In order to determine the line of movement of the shovels so as to prevent digging up of hills of corn or the like, an adjustment is provided for the cultivator beam. The adjustment for the beams 99 and 100 is illustrated in Figs. 2 and 3 and a similar adjustment is provided for the beams 103 and 105. This adjustment includes a plate 154 which is rested on the upper sides of the beams and which has slots 155 and 156 adjacent opposite ends thereof. Secured to one bar of each of the cultivator beams are clamp plates such as 157 and bolts 158 are extended through openings in the clamp plates 157 and through the slots 155 and 156, and nuts are engaged with the upper ends of these bolts above the plate 154. By moving the bolts through the slots and subsequently tightening the nuts the distance between the cultivator beams is varied. A somewhat different adjustment is provided for the beams 107 and 108 and this adjustment is illustrated in Figs. 7 and 8. Herein a plate 159 is rested on the upper side of the beams 107 and 108 and clamp strips 160 and 161 are rested on the upper side of the plate 159. Shoe bolts 162 and 163 are provided at opposite ends of the strip 160 and the lower ends of these shoe bolts engage adjacent bars of the beam 107. By loosening the nuts engaging the shoe bolts, the plate 159 may be slid relative to the strip 160 and in this way the position of the beam 107 is determined. Shoe bolts 164 and 165 are provided at opposite ends of the strip 161 and engage bars of the beam 108 and by loosening the nuts engaging these shoe bolts, the plate 159 may be moved relative to the beam 108 whereby the position of this beam may be adjusted.

The operation of the device is as follows: The tractor is positioned at one side of the field with the wheels thereof between the rows of corn or the like to be cultivated. The cultivator beams are then adjusted relative to each other to be so positioned at the sides of the rows of corn or the like along which they are to move that the shovels will not plow up hills of corn or the like as the tractor moves forward. The handles 126 and 140 are adjusted to determine the depth to which the shovels can dig upon movement of the tractor. After these adjustments have been made the tractor is caused to move forwardly and the operator who is seated on the seat 43 watches the movement of the shovels. It is only necessary to cause the tractor to travel in a straight line for any lateral shifting of the shovels that may be required may be effected by the operator who, while remaining on the seat 43, so shifts his position relative to the tractor that the frame including the bars 40 and 41 is shifted, this being expedited since the operator rests his feet on the axle 17 of the tractor. As the tractor moves forwardly with the shovels embedded in the earth, a thrust is impressed on these shovels. The adjustment of the shovels is effected transversely of the forward movement. However, when the operator braces his feet on the axle 17 he can apply his weight in such a way that shifting of the shovels transversely of the forward movement is expedited, and since the dead weight of the operator can be applied in this shifting in addition to the force attendant to his bracing himself on the axle 17 the shifting of the shovels can be effected without undue exertion on the part of the operator. Moreover, by merely slightly changing his position the operator may accurately guide the shovels and in this way the plowing up of hills of corn or the like is prevented. When one side of the field is reached the operator manipulates the handles 140 and 126 to retract the shovels from the soil and after the tractor has been turned around the operator then causes the shovels to be positioned to move through the soil and traverses the field in the direction opposite to that in which he first traveled, again utilizing his weight to effect shifting of the shovels to properly guide them as required.

Inasmuch as the cultivator is directly mounted on the tractor and is located in front of the operator it is clear that the guiding thereof so as to prevent plowing up of hills of corn or the like is facilitated. Furthermore, since the weight of the operator increases the force applied in the lateral shifting of the shovels, the shifting thereof is expedited. Moreover, the mounting of the movable parts of the cultivator is such that rectilinear movement of the shovels is insured which likewise facilitates guiding thereof.

In the foregoing description I have set forth a selected embodiment of my invention in connection with one form of tractor but it is to be understood that variations and modifications may be made therein particularly to adapt the cultivator for use with other tractors and I therefore do not wish to be limited to the precise details set forth but desire to avail myself of such changes and modifications as fall within the purview of the following claims:

I claim:

1. The combination with a tractor having brackets at the front end thereof, of a cultivator including a frame having a front bar removably mounted on said brackets and extending transversely of said tractor at the front end thereof, said frame including rear bars extending transversely of the tractor on each side thereof, said rear bars being parallel with the front bar and being spaced longitudinally of the tractor from said front bar, supporting shafts rotatably mounted in said front and rear bars at spaced intervals therealong, cultivator beams having shovels thereon, means supporting the rear ends of said cultivator beams, arms connected to said shafts and at the front end of said beams for supporting said beams from said bars, means interconnecting the forward ends of said cultivator beams, arms pivotally mounted on said rear bars and carrying a seat, and means connecting said arms to the means interconnecting the forward ends of said beams whereby the weight of the operator on said seat may be applied to effect shifting of said beams relative to said frame and independently of the tractor.

2. The combination with a tractor having brackets at the front end thereof, of a cultivator including a frame having a front bar removably mounted on said brackets and extending transversely of the tractor at the front end thereof, said frame including rear bars extending transversely of the tractor on each side thereof, said rear bars being parallel with the front bar and being spaced longitudinally of the tractor from said front bar, means interconnecting said front and rear bars to provide a unit frame for the cultivator, supporting shafts rotatably mounted on said front and rear bars at spaced intervals therealong, cultivator beams having shovels thereon, means supporting the rear ends of said cultivator beams, arms connected to said shafts and at the front ends of said beams for supporting said beams from said shafts, means interconnecting the forward ends of said cultivator beams whereby said beams may be moved as a unit transversely of the tractor, brackets on said rear bars, levers medially mounted on the brackets on the rear bars for pivotal movement, said levers carrying a seat at the rearward ends thereof, and means connecting the forward ends of said levers to the means interconnecting the forward ends of said beams whereby the weight of the operator on the seat may be applied to effect shifting of said beams relative to said frame and independently of the tractor.

3. The combination with a tractor having brackets at the front end thereof, of a cultivator including a frame having a front bar removably mounted on said brackets and extending transversely of the tractor at the front end thereof, said frame including rear bars extending transversely of the tractor on each side thereof, said rear bars being parallel with the front bar and being spaced longitudinally of the tractor from the front bar, brace means bridging the tractor and interconnecting said rear bars, means interconnecting said front and rear bars to provide a unit frame for the cultivator, supporting shafts mounted on said front and rear bars at spaced intervals therealong, cultivator beams having shovels thereon, means supporting the rear ends of said cultivator beams, arms connected to said shafts and to the front ends of said beams for supporting said beams from said shafts, arches at the front ends of said cultivator beams, means pivotally interconnecting said arches to the front ends of said cultivator beams, interconnecting means for said arches, means respectively connecting the arches to said interconnecting means, brackets on said rear bars, levers medially mounted on said brackets on the rear bars for pivotal movement, said levers carrying a seat at the rearward ends thereof, and means pivotally connecting the forward ends of said levers to said interconnecting means whereby the weight of the operator on the seat may be applied to effect shifting of the beams relative to said frame and independently of the tractor.

4. A cultivator comprising a frame including parallel front and rear members adapted to be detachably connected to a tractor to thereby support the cultivator on the tractor, supporting shafts extended between and journaled in said front and rear members, arches connected to said shafts for movement parallel with said front and rear members, beams having the front ends thereof pivotally connected to said arches and having cultivator shovels mounted thereon, means adjustably supporting the rear ends of said beams, means interconnecting said arches for conjoint movement, levers having corresponding ends thereof pivotally connected to the interconnecting means, means connected to said levers intermediate the ends thereof and pivotally connecting said levers to said frame, and a seat carried by the free ends of said levers whereon an operator may be seated whereby the weight of the operator may be thrown into the pivotal movement of said levers to facilitate movement of said arches and the beams carried thereby parallel to the front and rear members of the cultivator frame.

5. A cultivator comprising a frame including parallel front and rear members adapted to be detachably connected to a tractor to thereby support the cultivator on the tractor, supporting shafts extended between and journaled in said front and rear members, arches connected to said shafts for movement parallel with said front and rear members, beams having corresponding ends thereof connected to said arches to be supported thereby and having cultivator shovels mounted thereon, means cooperating with said arches and adjustably supporting said beams, means interconnecting said arches for conjoint movement substantially parallel with said front and rear members, lever means extending transversely of said front and rear members, the front end of said lever means being connected to said interconnecting means, and a seat carried by the rear end of said lever means, the mechanical advantage of said lever means being such that material movement of the seat moves the interconnecting means but a short distance whereby substantial force is impressed upon the interconnecting means to effect shifting of the arches and the beams carried thereby substantially parallel with the front and rear members.

GEORGE D. HOUSTON.